United States Patent Office 3,427,789
Patented Feb. 18, 1969

3,427,789
APPARATUS FOR HEAT SHRINKING BIAXIALLY ORIENTED POLYMER FILMS
Ronald Wilbur Emus, Greenville, S.C., assignor to W. R. Grace & Co., Cambridge, Mass., a corporation of Connecticut
Filed Nov. 30, 1962, Ser. No. 241,335
U.S. Cl. 53—329  3 Claims
Int. Cl. B65b 11/52

This invention relates to methods and apparatus for heat shrinking biaxially oriented polymer films. In particular, the invention relates to methods and apparatus for heat shrinking such films to form a protecting cover over the open side of a container.

Various methods and means for forming shrink covers over the open side of trays, dishes, pie plates, jars, milk bottles, etc., have previously been proposed. All known methods require relatively expensive and cumbersome procedures and equipment.

It is an object of this invention to provide greatly simplified and relatively very inexpensive methods and apparatus for forming a protective cover over the open side of a container.

Another object is to provide methods and apparatus for forming shrink covers in which high "mounding" of product presents no problems.

Yet another object is to provide methods and apparatus for forming shrink covers on containers having a wide variety of sizes and shapes without requiring any significant adjustments.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the inveniton will become apparent to those skilled in the art from this detailed description.

These objects are attained in the manner subsequently described utilizing heat shrinkable biaxally oriented thermoplastic films. Representative examples of such films are heat-shrinkable polyolefins, more particularly heat shrinkable, irradiated, biaxially oriented polyethylene and heat shrinkable, irradiated or non-irradiated, biaxially oriented polypropylene. While irradiated, biaxially oriented polyethylene is preferred, other suitable commercially available heat shrinkable materials include biaxially oriented saran (a vinylidene chloride polymer), biaxially oriented rubber hydrochloride, biaxially oriented polyethylene terephthalate (Mylar), biaxially oriented nylon film and biaxially oriented polystyrene.

The invention will be described with reference to the accompanying drawings, in which.

Figure 1:
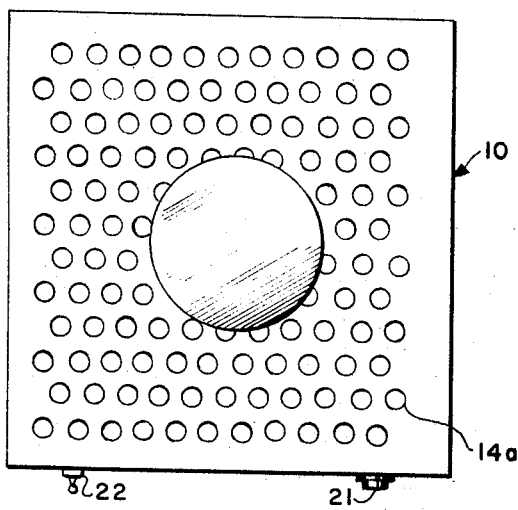
FIGURE 1 is a plan view of apparatus embodying this invention.
Figure 2:
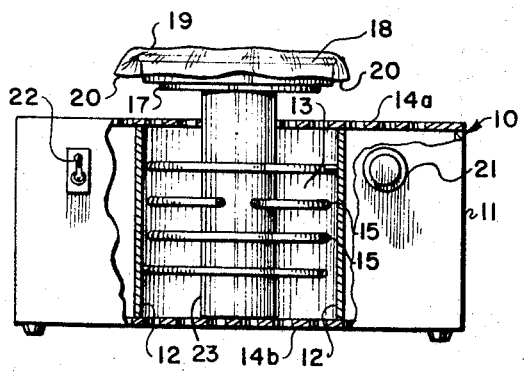
FIGURE 2 is a front elevational view of the device shown in FIGURE 1 with certain portions broken away.

The device shown includes a tubular furnace 10 comprising outer tube 11 and inner tube 12. The cross-section of the tubes may have any desired geometric shape. The embodiment shown, having a rectangular outer tube and a generally cylindrical inner tube 12, is purely illustrative. The inner tube defines a chamber 13 through which there is created a flow of a heating gas, e.g., air. Mounted above and below the chamber are perforated plates or grids 14a and 14b which permit gas flow through the chamber. Mounted within the chamber are heating means 15, four of which are shown. In the device shown these heating means are spiral electric resistance heaters of the type ordinarily used in commercial electric kitchen ranges, and can be connected to any suitable source of electric power. Suitable switches, e.g. 22 and control means, e.g. rheostat 21, are provided as necessary. Other heating means, e.g., steam coils, radiant heaters, etc. could be used if desired. Mounted centrally of the chamber and above the top grid 14a is a container support platform 17 which is carried by rigid upright column 23. In FIGURE 2 a container 18 with an overlying limp sheet 19 of heat-shrinkable thermoplastic film is held by the platform 17. Looking in particular at FIGURE 2 it will be seen that the peripheral edge of the container platform 17 lies within a vertical projection of the open upper end of the hollow tubular member 12. It may also be seen that the container 18 comes to the very edge if not slightly beyond the edge of the vertical projection of the open upper end of the hollow member 12. The container 18 may overlap the vertical projection of the hollow tubular member 12 by a considerable amount without greatly diminishing the efficient operation of the apparatus.

There are several critical limitations in the design of the above-described apparatus. These can be summarized as follows: (a) the top opening of chamber 13 (i.e., that covered by grid 14A or other equivalent device) must be large enough to provide a flowing column of heated gas around the entire periphery of the container supported thereover; and (b) the support platform must be sufficiently spaced from the grid to prevent contact of skirt 20 of the film sheet 19 therewith and yet not spaced so far away that the flowing heated gas becomes too cool to shrink the film skirt.

The grids 14a and 14b are not absolutely required. They do, however, serve as safety guards and therefore are usually preferred. In addition it has been found that use of a grid 14a will give more efficient operation and greater uniformity of results. When there is no grid at all, or when the grid only slightly retards the flow of heated gas, poor thermal efficiency results, i.e., much more heating power must be supplied to obtain satisfactory shrink covers in about the same time. It is to be stressed, however, that satisfactory shrink covers are nevertheless obtained. When the grid retards flow of heated gas too much, there is ordinarily poor top shrink—that is, the upwardly flowing hot gas fails to bubble over the top of the container and overlying film. Those skilled in the art will be readily capable of determining, after a few empirical tests, which type of grid gives optimum results for any specific package.

Figure 3:
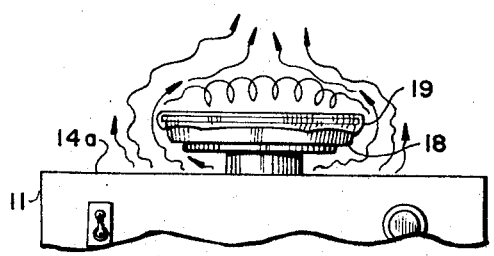
FIGURE 3 is an elevational view showing diagrammatically the method of this invention as it is practiced using the device shown in FIGURES 1 and 2.

Operation of the abovedescribed device is commenced by energizing the heating means 15. In a short period of time the gas (usually atmospheric air) within chamber 13 is sufficiently heated to cause natural convection (sometimes called "free convection") upward flow thereof out of upper grid 14a. Increased heating results in increased flow velocity of the heated gas. A product-containing tray, plate, or other like container is then placed on the platform 17 and a limp sheet of heat-shrinkable thermoplastic film is draped thereover. The film sheet is of sufficient size to provide an overhanging skirt 20 around the entire top periphery of the container 18. When the velocity of the heated gas flowing out of grid 14a is relatively low there is no need to restrain the overlying film sheet at any time. Temporary manual restraint of the film sheet at the edges of container 18 is desirable at high flow velocities. In either case the column of heated gas flows by natural convection around all sides of the container and bubbles over the top of the container and overlying sheet (see FIGURE 3). Almost immediately the skirt 20 begins to shrink. In a short time (e.g. about 3 to 5 seconds) the skirt will shrink against the sides and under the lip of the container thereby locking the film sheet over the open side of the container. Simultaneously, the top of the film sheet is at least partially shrunk over the top of the container and product therein. In those cases where the product is not refrigerated or frozen, the film sheet will be shunk into a taut cover over the top of the container and product. When the product is cold somewhat less top shrink results. A taut top cover can be obtained in such cases by brief application of heat to the top of the film sheet after it has been locked over the open side of the container. Faster cycles are obtained by use of greater heating capacity which in turn increases the natural convection flow velocity.

Advantages acruing from the use of the above method and apparatus are numerous. They include (1) inexpensive, easily constructed equipment is used; (2) containers of widely varying size and shape can be provided with shrink covers without adjusting the apparatus or procedure; (3) excellent shrink covers are obtained even in those cases where the product is highly "mounted," i.e., projects to a height well above the height of the container side walls; and (4) product in the container is shielded from heat and is not exposed to high temperature.

Many modifications of the described method and apparatus are possible. For example one could blow a heated gas (e.g. air) through the grid 14a at a low velocity and accomplish results substantially equivalent to those obtained using natural convection flow. All such equivalent procedures and means are to be considered as included within the scope of this invention.

In general, there is employed in the invention polyethylene film or tubing which has been irradiated to an extent of 2 to 100 megarad, preferably 6 to 20 megarad. The irradiation can be accomplished in conventional fashion, e.g. by the use of a high voltage resonant transformer, such as the 2,000,000 volt General Electric transformer, or similar transformers of 50,000 to 50,000,000 volts or a Van de Graaff electron generator. In addition to the use of electrons there can be employed beta rays, gamma rays, e.g. by employing cobalt 60, etc. There can be employed any of the irradiation procedures disclosed in Baird et al. U.S. Patent 3,022,543 and Rainer et al. U.S. Patent 2,877,500, for example. The entire disclosures of the Baird and Rainer Patents are hereby incorporated by reference.

The biaxial orientation is normally carried out to an extent of 100 to 700% longitudinally and 100 to 900% laterally. The biaxial stretching can be carried out by blowing iradiated polyethylene tubing as disclosed in the above Baird et al. patent. The irradiated biaxially oriented polyethylene prepared by such a procedure has a high shrink energy, e.g. 100 to 500 p.s.i.

There can be employed as the starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000, or, even higher.

In place of the irradiated polyethylene film there can be employed irradiated or non-irradiated, biaxially oriented polypropylene film or any of the other heat shrinkable, biaxially oriented thermoplastic films previously mentioned.

It will be obvious to those skilled in the art that various changes may be made in the invention without departing from the spirit and scope thereof and therefore the invention is not limited by that which is illustrated in the drawing and described in the specification, but only as indicated in the accompanying claims.

I claim:
1. A device for forming shrink covers on a container comprising:
 (a) a hollow member having upright walls with an open upper end and an open lower end defining a chamber,
 (b) a supporting platform positioned immediately above said upper end adapted to support a container, the periphery of said platform being spaced within the vertical projection of the open upper end of said hollow member,
 (c) means for supporting said platform above said upper end and
 (d) means for heating said chamber thereby causing the upward flow of heated gases therethrough by natural convection, said gases flowing upwardly through said chamber and around the edges of a container supported on said platform and over the top of said container.

2. The device of claim 1 wherein said means for heating comprise electric resistance heaters positioned within said chamber.

3. The device of claim 2 wherein the means for supporting said platform above said upper end comprises:
 (i) a grid poistioned over the lower end of said chamber, said grid being secured to said hollow member; and,
 (ii) a rigid upright column resting on said grid and extending through said chamber to carry said supporting platform.

References Cited
UNITED STATES PATENTS

| | | |
|---|---|---|
| 2,976,655 | 3/1961 | Dreyfus et al. |
| 3,120,728 | 2/1964 | Snow et al. _____ 53—42 |
| 1,444,958 | 2/1923 | De Lucni _____ 219—366 X |
| 2,701,921 | 2/1955 | Strongson _____ 219—366 X |
| 2,902,349 | 9/1959 | Lerner _____ 23—292 X |

TRAVIS S. McGEEHEE, *Primary Examiner.*

R. L. FARRIS, *Assistant Examiners.*

U.S. Cl. X.R.

53—42